United States Patent Office 2,790,166
Patented Apr. 23, 1957

2,790,166

CONTROL SYSTEM FOR RADIO POSITION LOCATOR

William E. Buehrle, Jr., Levittown, and Conrad Lanza, Bayside, N. Y., assignors to Hazeltine Research, Inc., Chicago, Ill., a corporation of Illinois Application May 13, 1953, Serial No. 354,701

15 Claims. (Cl. 343—7.3)

General

The present invention relates to control systems for radio position locators such as airborne distance-measuring equipment which includes searching and tracking systems for locating an object and thereafter determining the distance of the airborne equipment therefrom.

One important requirement in aerial navigation is the determination of the distance between an aircraft in flight and known geographic points along the line of flight. Distance-measuring equipment has been employed in aircraft to provide a pilot with an indication of the distance between his aircraft and such points. Modern airborne equipment usually comprises a transmitter for transmitting coded pulses for interrogating selected terrestrially located responder beacons along the line of flight. Individual ones of these beacons may respond only to pulses corresponding to their particular interrogating code by transmitting coded reply pulses for use by the distance-measuring equipment on the aircraft. Desired reply pulses actuate the coding apparatus in the distance-measuring equipment and a voltage is derived which is representative of the round-trip propagation time between the aircraft and the responder beacon. It will be evident that the magnitude of this voltage changes in accordance with the relative movement between the aircraft and the beacon.

In order to utilize the coded reply pulses of a selected beacon which is being interrogated by the moving aircraft, the distance-measuring equipment is provided with a searching system which is effective to place the equipment in a state of selective response to the reply signals from a responder beacon. To accomplish searching, prior distance-measuring equipment includes a receiver having a received signal-translating channel that is normally blocked and a gated circuit therein for conditioning the channel to translate pulses which may be received within a short gating interval. Varying the time relation of the gating interval relative to the transmission of the interrogating pulses from the distance-measuring equipment is effective to achieve searching, as will be clear from a consideration of the following example. Assuming that the receiver is gated or conditioned to translate pulses within a short interval after the interrogating signal is sent out and that a reply signal is returned directly, as in the case where the aircraft is very close to the beacon, the beacon reply is accepted and a distance indication is obtained. If the reply should be delayed beyond the duration of the short gating interval, thus representing a greater separation of the aircraft and the beacon, that reply is not accepted. However, delaying the gating interval relative to the transmitted interrogation may condition the receiver to accept the delayed reply and allow the distance-measuring circuits to provide an indication of a greater distance from the aircraft to the beacon. When a reply has been found, the search is discontinued and a tracking system is energized to keep the reply within the gating time to facilitate an accurate determination of distance.

The distance-measuring equipment includes coding and transmitting apparatus for interrogating any selected one of a plurality of responder beacons and also suitable decoders which, for the most part, select only coded reply pulses from the selected responder beacon, thus materially reducing the possibility of the searching operation being interrupted by challenging pulses received from nearby aircraft or by reply pulses from a beacon or beacons which responded to those challenges. However, it is not possible completely to eliminate the aforesaid adverse effects of such challenging pulses since in regions of heavy aircraft traffic those pulses may occur at random with a spacing corresponding to the reply code of the interrogated beacon. Random pulses of this sort constitute a false signal which briefly interrupts the searching operation and, for the purpose of saving time and promoting safer navigation, it is extremely desirable that the searching operation be resumed very quickly after the equipment responds to a false signal, particularly in regions of congested aerial traffic.

Many prior distance-measuring equipments possess the disadvantage of having considerable delay in the resumption of the searching operation after the equipment has been placed in a tracking condition by stray received pulses. Many control systems for enabling the distance-measuring equipment to resume searching after a tracking operation initiated by a false signal employ circuits including time-constant networks which have rather slow charging or recovery rates that prevent a quick resumption of the searching operation. These networks, however, sometimes serve the useful function of preventing the equipment from returning to searching activities immediately after a target is temporarily lost for any of several reasons, for example, the surface of the aircraft might shield the receiving antenna of the craft during a turning operation, or the beacon may have had a temporary or momentary interruption in operation. Prior such control systems for enabling the distance-measuring equipment to resume search after a brief tracking interlude occasioned by the reception of false signals have, in regions of congested aerial traffic, consumed as much as one-third more time in a single search sweep than has since proved necessary. Furthermore, prior such systems have been somewhat complex and have often required the use of relays which are rather costly and are subject to contact and other troubles.

It is an object of the present invention, therefore, to provide for a radio position locator a new and improved control system which avoids one or more of the above-mentioned disadvantages and limitations of prior such systems.

It is another object of the invention to provide for use in distance-measuring equipment a new and improved control system which enables that equipment quickly to resume a searching operation which was interrupted by a tracking operation initiated by the reception of false reply signals.

It is a further object of the invention to provide for the searching apparatus of a distance-measuring equipment a new and improved control system which is simple in construction, inexpensive to manufacture, fast acting, and also reliable in operation.

It is a still further object of the present invention to provide for use in a distance-measuring equipment a control system which saves time in a searching operation being conducted in a zone of heavy airborne traffic.

In accordance with a particular form of the invention, there is provided in a radio position locator including a searching and tracking device responsive to a constant potential for initiating tracking and a varying potential for searching, a control system comprising a first circuit effective to develop a first potential of an approximately constant value during a searching interval. The control system also includes a time-constant control circuit coupled to the first circuit for applying thereto a control signal effective to initiate a tracking interval and to vary the aforesaid first potential in a predetermined manner from the approximately constant value during the tracking interval. The control system further includes a voltage-divider apparatus responsive to the first potential during the searching interval for developing during that searching interval a second potential having a substantially constant value and responsive to the variation in the first potential during the tracking interval for developing a third potential during that tracking interval and for substantially instantaneously developing the above-mentioned second potential at the end of the tracking interval. The control system additionally includes a translating circuit for deriving from the second potential and applying to the searching and tracking device a varying searching potential and for deriving from the third potential and applying to that device a constant potential for initiating tracking.

For a better understanding of the present invention, together with other and further objects thereof, reference is had to the following description taken in connection with the accompanying drawings, and its scope will be pointed out in the appended claims.

Referring now to the drawings.

Figure 1:
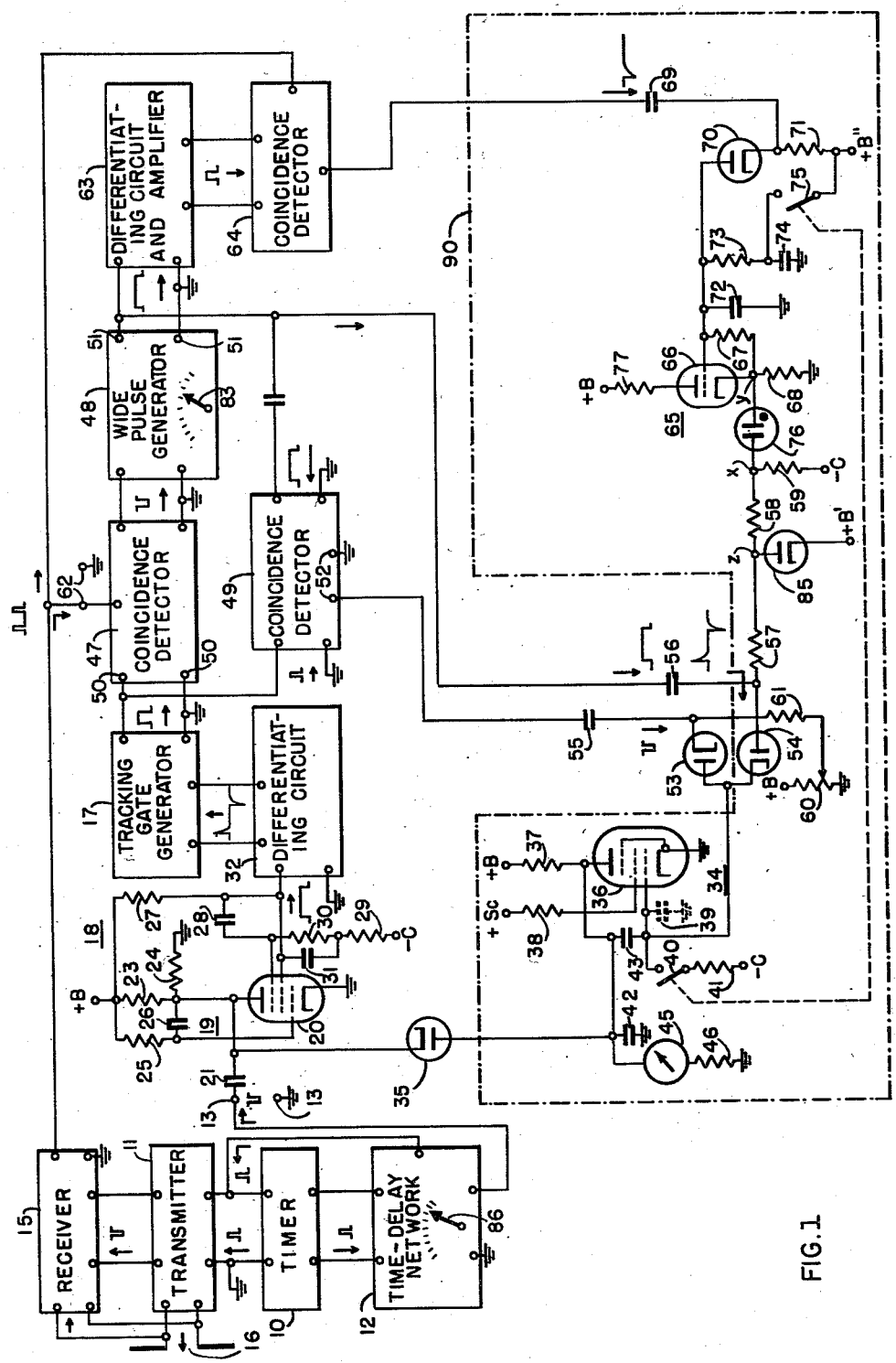
Fig. 1 is a circuit diagram, partly schematic, of a radio position locator or distance-measuring equipment including a control system in accordance with the present invention.

*Description of Fig. 1 distance-measuring equipment excluding control system*

Referring now more particularly to Fig. 1 of the drawings, the radio position locator or distance-measuring equipment, which will be assumed to be installed in an aircraft in flight, includes means for transmitting periodic time-reference pulses and for receiving position-representative delayed pulses from a terrestrially located responder beacon. The transmitting means includes a timer 10 coupled to a transmitter 11 for supplying periodic timing pulses thereto. A time-delay network 12, which includes a suitable amplifier or polarity-reversing device and an adjustable control 86, is also coupled between the timer 10 and the transmitter 11 for supplying to the latter periodic pulses delayed with respect to the pulses from the timer. The transmitter is designed to transmit periodic time-reference pulses in the form of wave-signal pulses of predetermined duration and spacing representative of the interrogating code of the distance-measuring equipment. The time-delay network 12 is also coupled to a pair of input terminals 13, 13 of a tracking system for supplying control pulses of negative polarity to that system. The distance-measuring equipment also includes a conventional receiver 15 coupled to an antenna system 16 common to the transmitter and the receiver. An output circuit of the transmitter 11 may be coupled to the receiver 15 for supplying negative polarity disabling pulses to the receiver each time the transmitter develops a radio-frequency pulse for application to the antenna system 16.

The distance-measuring equipment includes a circuit for generating tracking pulses, which circuit comprises a tracking gate generator 17 responsive to applied pulses of negative polarity for generating positive polarity tracking pulses of substantially constant duration. The distance-measuring equipment includes a searching and tracking device 18 responsive to a constant potential for initiating tracking and a varying potential for searching, which varying potential is effective to sweep the tracking pulses over a range of times relative to the time-reference pulses developed by the transmitter 11 and radiated by the antenna system 16. The searching and tracking device 18, in addition to including the generator 17, also includes a generator of pulses of variable yet controllable duration in the form of a univibrator such as a synchronized sweep generator 19 of the phantastron type. Such a generator includes a pentode 20 which is capable of developing a sweep voltage of controllable duration at its anode and simultaneously developing a rectangular pulse of controllable duration at its screen electrode when it is triggered by the application of a negative polarity control pulse supplied by the terminals 13, 13 through a coupling condenser 21 to the anode of the tube and from the anode through a condenser 26 to the control electrode thereof. The anode of the tube 20 is connected to a source of positive potential indicated +B through a load resistor 23 and is connected to ground through a resistor 24. The cathode of the tube 20 is connected directly to ground and the control electrode is connected to the source +B through a resistor 25. The values of the resistor 25 and the condenser 26 determine the slope of the trace portion of the sweep wave generated by the generator 19 while the values of the resistor 23 and the condenser 26 primarily determine the recovery time of the generator. The screen electrode of the tube 20 is connected to the source +B through a resistor 27 and is also coupled to the suppressor electrode through a condenser 28. A source of negative potential indicated as —C is connected to the suppressor electrode of the tube through series-connected resistors 29, 30 and the junction of these resistors is coupled to the screen electrode through a condenser 31. The resistor 30 and the condenser 31 serve to couple the wave developed at the screen electrode to the suppressor electrode while the condenser 28 and the resistor 30 comprise a differentiating circuit for translating a differentiated signal from the screen electrode to the suppressor electrode. The screen electrode of the tube 20 is coupled to the input circuit of the tracking gate generator 17 through a differentiating circuit 32 of conventional construction.

The distance-measuring equipment also includes a direct-current amplifier 34 and a clamping device in the form of a unidirectionally conductive device, such as a diode 35, which is coupled between the generator 19 and the amplifier 34 for controlling the duration of the output signal of the generator 19. As will be made clear hereinafter, the generator 19, the diode 35, and the amplifier 34 may be considered to constitute a searching and tracking device which is responsive to a predetermined constant potential applied to unit 34 for effecting tracking and is responsive to a varying potential for effecting searching by the distance-measuring equipment. The cathode of the diode 35 is connected to the anode of the tube 20 while the anode of the diode is connected to the anode of a pentode amplifier tube 36 of the unit 34. The anode of the tube 36 is connected to a source of potential +B through a load resistor 37, the screen electrode thereof is coupled to a source of potential +Sc through a voltage-dropping resistor 38, and the cathode and the suppressor electrode are connected to ground. The control electrode of the tube 36 is adapted selectively to be connected to a source of negative potential —C having a value of about —6 volts through a switch 40 and a resistor 41. The anode of the tube 36 is also coupled to ground through a relatively large energy-storage condenser 42 and is also coupled to the control electrode through a condenser 43. The arrangement of the amplifier 34 is such that feedback exists between the anode and the control electrode of the tube 36 and, as the conductivity of the tube increases, the apparent increase in the capacitance of the condenser 43 due to the amplification factor of the tube causes the control electrode-cathode capacitance of the tube to appear as a relatively large capacitance which is represented in broken-line construction as a condenser 39. As will be made clear hereinafter, the amplifier 34, under certain operating conditions, serves as a sweep oscillator for controlling the duration of the two output signals developed by the generator 19.

The distance-measuring equipment also includes means responsive to the potential at the anode of the tube 36 for indicating the position of the tracking pulses within the range of times those pulses may occur in relation to the transmitted time-reference pulses developed by the transmitter 11. The means just mentioned comprises a voltmeter 45 calibrated in distance and coupled between the anode of the tube 36 and ground through a current-limiting resistor 46.

The distance-measuring equipment further includes a first gated circuit responsive jointly to the tracking pulses and the received pulses for developing a first signal of substantially constant value or energy content and responsive jointly to the tracking pulses and the aforesaid first signal for developing a second signal of an energy content representative of the time relation between the tracking pulses and the received pulses. This circuit means comprises a first gated circuit or coincidence detector 47 in cascade with a wide pulse generator 48 for developing the first output signal and includes a second gated circuit or coincidence detector 49 for developing the second signal. The coincidence detector 47 is of conventional construction and may, for example, include an electron tube having a control electrode-cathode input circuit coupled to the output circuit of generator 17 through a pair of terminals 50, 50 and may also include a suppressor electrode-cathode circuit coupled to a pair of input terminals 62, 62 which, in turn, are coupled to the output circuit of the receiver 15. The wide pulse generator 48 may be a suitable unit such as a multivibrator which is responsive to the leading edges of the output pulses from unit 47 for developing a first signal comprising pulses of constant amplitude and duration and, hence, a substantially constant energy content, which duration is greater than that of the tracking pulses from the unit 17 and the short duration received pulses from receiver 15. Generator 48 preferably includes a suitable adjustable control 83 for selectively adjusting the duration of the output pulses supplied to the output terminals 51, 51 in accordance with the spacing of paired pulses received from a selected responder beacon. The coincidence detector 49 may be similar in construction to the detector 47. The output circuit of the tracking generator 17 is also coupled to a first input circuit of the detector 49 while the output terminals 51, 51 of the generator 48 are connected to another input circuit of unit 49 to develop at the output terminals 52, 52 thereof a second signal comprising pulses of constant amplitudes and durations which may vary depending upon the time relation of the tracking pulses and the received pulses, as will be explained subsequently.

The distance-measuring equipment additionally includes a comparison circuit differentially responsive to the first pulse signal from the generator 48 and to the second pulse signal from the coincidence detector 49 for deriving and applying to the device 18 a potential varying with the energy content of the second pulse signal from the coincidence detector 49. This circuit includes a pair of oppositely poled unidirectionally conductive devices such as diodes 53 and 54, the cathode of the diode 53 being connected to the ungrounded output terminal 52 of the detector 49 through a coupling condenser 55 and its anode being connected directly to the cathode of the diode 54 and to the control electrode of the direct-current amplifier tube 36. The anode of the diode 54 is coupled to the ungrounded output terminal 51 of the generator 48 through a condenser 56 and is connected to a source of bias potential —C having a suitable substantially constant value such as —8 volts through resistors 57, 58, and 59. The three resistors and the condenser just mentioned are proportioned to constitute a differentiating circuit for the pulses supplied by the wide pulse generator 48. A suitable bias derived from the adjustable tap of a voltage divider 60 is applied to the cathode of the diode 53 through a resistor 61. For convenience of understanding the operation of the tracking system, the diodes 53 and 54 will be referred to hereinafter as "track-in" and "track-out" diodes, respectively.

The circuits thus far described constitute a tracking system which is described and claimed in the copending application of Robert B. J. Brunn, Serial No. 354,747, filed concurrently herewith, and entitled "Tracking System for Radio Position Locator."

The output terminals 51, 51 of the wide pulse generator 48 are connected to a differentiating circuit and amplifier 63 which is effective to derive in its output circuit positive polarity pulses having leading edges occurring in time coincidence with the trailing edges of the wide duration pulses from the unit 48. The output circuit of the unit 63 is connected to a first input circuit of a coincidence detector 64 which has a second input circuit coupled to the output circuit of the receiver 15. The coincidence detector 64 may be similar in construction to the units 47 and 49 so that it responds to an output signal from unit 63 which is coincident with a second pulse of paired pulses developed in the output circuit of the receiver 15. The units 47, 48, 63, and 64 effectively constitute a decoder which responds to received paired pulses from the receiver 15 having a predetermined spacing corresponding to the particular code of the paired pulses emitted by a selected responder beacon.

*Description of control system of Fig. 1*

The distance-measuring equipment also includes a control system 90 in accordance with the present invention which is coupled between the coincidence detector 64 and the generator 19 of the searching and tracking device 18. This control system includes a first circuit preferably in the form of a cathode-follower repeater 65 effective to develop a first potential of an approximately constant value of, for example, 105 volts at the cathode of its electron-discharge device or tube 66 during a searching interval. The anode electrode of the tube 66 is connected to a source of potential +B through a load resistor 77, the control electrode thereof is connected to the cathode through a grid-leak resistor 67, and the cathode of the tube is returned to ground through a resistor 68, thus normally maintaining the tube in a conductive condition during a searching interval, as will be made clear hereinafter.

The control system 90 also includes a time-constant control circuit coupled to the control electrode-cathode circuit of the tube 66 for applying thereto a control signal effective to cause the searching and tracking device 18 to initiate a tracking interval, and to vary the first potential developed at the cathode of the tube 66 in a predetermined or exponential manner from its initial value of 105 volts during that tracking interval. This control circuit is coupled to the output circuit of the coincidence detector 64 through a coupling condenser 69 and includes a diode 70 having its cathode connected to the condenser 69 and to a source of potential +B" through a resistor 71. The anode of the diode is connected to the control electrode of the tube 66 and is also connected to ground through a condenser 72 which is connected in parallel with the series combination of a large resistor 73 and a condenser 74 having a much larger value of capacitance than that of the condenser 72. The source of potential +B" is adapted selectively to be connected to the junction of the resistor 73 and the condenser 74 through a switch 75 which is preferably ganged with the switch 40 in the control-electrode circuit of the tube 36. The time constant of the condenser 72 and the series-connected resistors 67 and 68, as influenced by the action of the cathode follower 65, is such that these elements are effective to stretch the duration of negative polarity control pulses applied by the coincidence detector 64 to the cathode of the diode 70. Accordingly, this time constant is greater than the duration of an individual output pulse of unit 64. The capacitance of the condenser 74 is many times that of the condenser 72 so that it is charged only by the application of a series of regularly recurring pulses supplied by the output circuit of the coincidence detector 64. The time constant of the resistor 73 and the condenser 74 is considerably greater than that of the network 72, 67, 68 and is such that the condenser 74 can discharge appreciably only after a predetermined interval corresponding to the so-called "memory" period of the distance-measuring equipment. This period will be explained in greater detail subsequently.

The control system 90 also includes a voltage-divider apparatus responsive to the first potential developed at the cathode of the tube 66 during the searching interval of the equipment for developing during that interval a second potential having a substantially constant value and responsive to the aforesaid variation in the first potential at the cathode of tube 66 during the tracking interval for developing a third potential during that tracking interval and for substantially instantaneously developing the aforesaid second potential at the end of the tracking interval. This apparatus includes a device having a nonlinear characteristic and may comprise a gaseous-discharge device or glow tube 76 having one electrode connected to the cathode of tube 66 and the other electrode thereof connected to the junction of the resistors 58 and 59. This voltage-divider apparatus further includes the source —C, the resistors 58, 59, and a unidirectionally conductive device or diode 85 which serves as a clamping device that has its anode connected to the junction of the resistors 57, 58 and its cathode connected to a source of potential +B' which may be of the order of 6 volts. The second and third potentials mentioned above are those developed at point Z comprising the junction of the resistors 57 and 58 during the searching and tracking intervals, respectively, of the distance-measuring equipment.

The control system 90 further comprises a translating circuit, including an output circuit coupled to the device 18 and including an energy-storage input circuit coupled to the voltage-divider apparatus just described, for deriving in its output circuit from the second potential developed at point Z and applying to the device 18 a varying search-potential and also for deriving in its output circuit from the third potential developed at point Z and applying to that device a predetermined constant potential for initiating tracking. This translating circuit comprises the amplifier or sweep generator 34 and the track-out diode 54 which serves as a switching device between the condenser 39 in the control electrode-cathode circuit of the tube 36 and the point Z of the voltage-divider apparatus.

*Explanation of searching operation of distance-measuring equipment of Fig. 1*

In considering the operation of the distance-measuring equipment, it will be assumed initially that the switches 40 and 75 have been closed momentarily and then opened so as to place a negative charge across the condenser 39 in the control electrode-cathode circuit of the tube 36 and to place a positive charge across the condenser 72 in the control electrode-cathode circuit of the tube 66. This charge on the condenser 72 ensures that the tube 66 is fully conductive and that there is developed at the cathode thereof a positive potential sufficient to render the glow tube 76 conductive. The flow of current through the tube 76 and the resistor 59 develops a positive potential at points X and Z comprising the junction of the resistors 58 and 59 and the junction of the resistors 57 and 58, respectively. The moment the potential at the point Z exceeds that of the source +B' connected to the cathode of the diode 85, it is effective to render the latter conductive thus clamping the potential at the point Z to that of the source +B'. The substantially constant potential of the source +B' is greater than that on the control electrode of the tube 36 so that the track-out diode 54 is rendered conductive. Prior to the diode 54 becoming conductive, the anode potential thereof corresponded to that of the source —C which, in one embodiment of the invention, had a value of about —8 volts. With the tube 66 fully conductive, however, the cathode potential thereof is at a positive potential of about 105 volts and the point X is at a substantially constant potential of 6 volts in one embodiment of the invention. When the diode 54 is rendered conductive as explained above, the condenser 39 in the control electrode-cathode circuit of the tube 36 begins to charge slowly through the resistor 57 from its initial value —C toward a more positive level such as the zero level represented by Curve B of Fig. 2. For convenience, it will be assumed that the charging of the condenser 39 begins at time $t_1$ as represented in Curve B.

Figure 2:
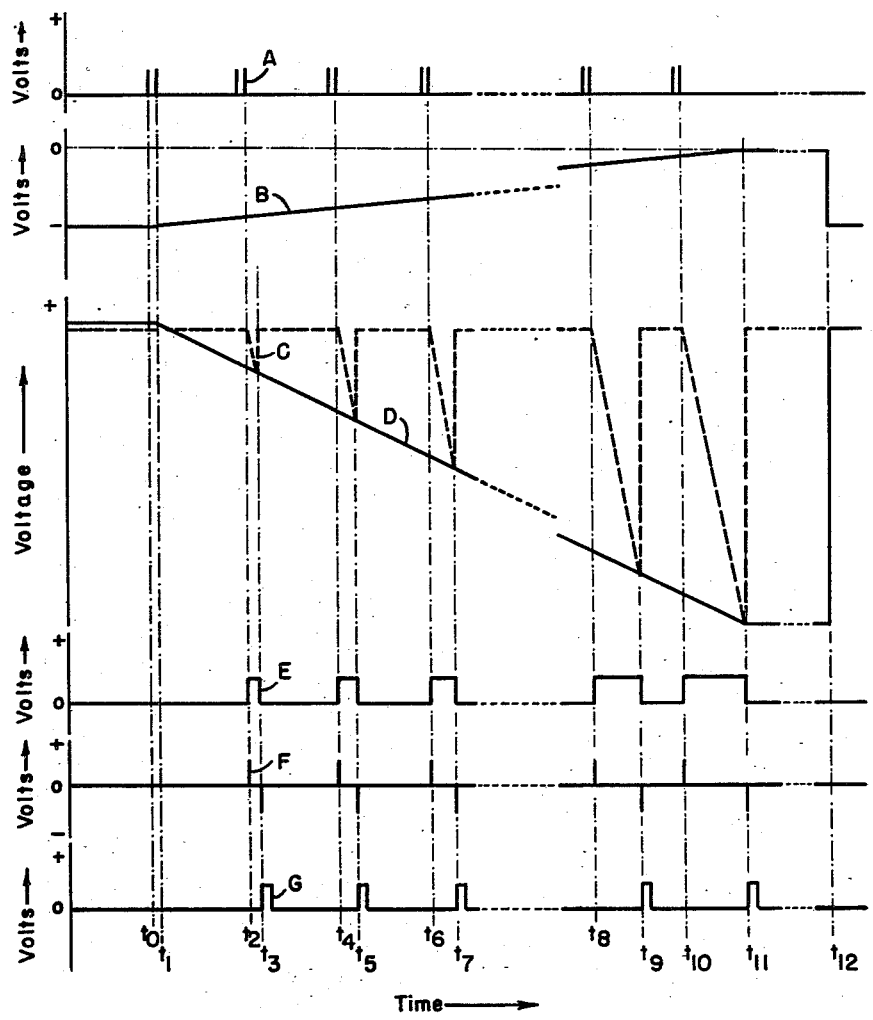
Fig. 2 is a graph utilized in explaining the searching operation of the distance-measuring equipment.

At time $t_0$ the timer 10 applies to the transmitter 11 a control pulse such as that represented by the first pulse of Curve A of Fig. 2. A predetermined interval later at time $t_1$, governed by the interrogating code of the particular distance-measuring equipment, the time-delay network 12 in response to the initial timing pulse applies a second pulse to the transmitter. Paired radio-frequency pulses which, like the pulses of Curve A constitute time-reference pulses, are developed by the transmitter and radiated by the antenna system 16. A pulse of negative polarity is developed at time $t_1$ in another output circuit of the delay network 12 simultaneously with the application thereby of the positive pulse to the transmitter 11, and the negative pulse is applied through the coupling condenser 21 and the condenser 26 to the anode and the control electrode, respectively, of the generator 19. At this instant the potential developed across the relatively large condenser 42 and, thus, at the anode of the tube 36, is slightly higher than that of the tube 20 so that the diode 35 is conductive and thereby effective to ensure that the potentials of the tubes 36 and 20 are then substantially the same. The negative triggering pulse from the terminals 13, 13 is ineffective at time $t_1$ to alter the operating condition of the tube 20 since the anode of tube 20 is momentarily connected to a strong voltage source comprising the condenser 42. The condenser 39 in the control electrode-cathode circuit of the tube 36 continues to charge as represented by Curve B, so that as the control electrode of the tube 36 becomes more positive that tube becomes more conductive and causes the anode potential thereof to decrease in the manner represented by Curve D. Just prior to time $t_2$ the transmitter 11 is again triggered and at time $t_2$ another negative triggering pulse is applied to the control electrode of the tube 20. This pulse causes the potential of the screen electrode to increase, which increase is translated to the suppressor electrode by way of the coupling networks 30, 31 and 28, 30. This in turn permits the anode current to increase at time $t_2$ and causes a substantially linear decrease in the anode potential as represented by the broken-line Curve C between the interval $t_2$-$t_3$. At time $t_3$ the anode potential of tube 20 just begins to fall below that of the anode of the tube 36 and this renders the diode 35 conductive. Since the condenser 42 connected between the anode and the cathode of the tube 36 is relatively large and, therefore, has considerable energy stored therein, the potential of the anode of the tube 20 cannot fall below that of the anode of the tube 36. This is instrumental in causing the anode potential of the tube 20 suddenly to return to its original level at about time $t_3$, thus producing the retrace portion of the first sweep wave of Curve C. As the anode potential of the tube 20 was decreasing in the manner represented by Curve C during the interval $t_2$-$t_3$, the screen-electrode potential at the same time suddenly increased as represented by Curve E and then returned at time $t_3$ to its original value, thus producing a rectangular output pulse. It will be noted that the screen potential pulse has a duration corresponding substantially with that of the sweep potential developed at the anode of the tube 20.

The synchronizing pulses applied to the anode of the tube 20 at times $t_4$, $t_6$, $t_8$, etc. similarly develop negative-going sweep potentials at the anode of that tube and also develop positive-going rectangular pulses at the screen electrode of the tube. It will be observed that the magnitudes and the durations of the sweep potentials of Curve C during the successive intervals $t_4$-$t_5$, $t_6$-$t_7$, $t_8$-$t_9$, etc. are progressively greater and that the durations of the screen-electrode potential pulses represented by Curve E also become progressively greater. In each instance the magnitude of the sweep potential developed at the anode of the tube 20 is determined by the gradual decrease in the anode potential of the tube 36 under the control of the clamping diode 35. It will, therefore, be seen that the units 19 and 34, under the described conditions, constitute sweep generators wherein the unit 34 has a much lower sweep rate than that of unit 19. At a later time, such as time $t_{11}$, the condenser 39 becomes charged from the source +B' to substantially a zero value which is the maximum value permitted by the parameters of the oscillator 34, and the anode potential of the tube 36 remains at a fixed level as represented by the horizontal line of Curve B between the interval $t_{11}$-$t_{12}$. The charging time constant of the condenser 39 is such that, in the absence of a signal received by the receiver 15, the condenser requires a predetermined interval of time such as 20 seconds for it to charge to the maximum value permitted by the circuit, namely, from the potential of −8 volts to a zero potential level. This predetermined interval of time is represented in Fig. 2 as the period $t_1$-$t_{11}$ and, in one embodiment of the invention, has a duration of 20 seconds in the absence of any received pulses from the receiver 15. Thus, the trace portion of the wave of Curve D is chosen to have a duration which is considerably greater than the greatest expected round-trip propagation time between the distance-measuring equipment on the aircraft and a responder beacon interrogated. This round-trip propagation time is representative of a suitable distance such as 100 miles between the distance-measuring equipment and the responder beacon. At time $t_{12}$ the operator momentarily closes the ganged switches 40 and 75 and a negative charge corresponding to that of the source −C is placed across the condenser 39 and, hence, on the control electrode of the tube 36. The circuits of the amplifier 34 and the generator 19 are then conditioned to repeat the cycle of operation just described.

The output pulses of curve E from the screen electrode of the tube 20 are applied to the differentiating circuit 32 which develops pulses of the type represented by Curve F of Fig. 2 for application to the input circuit of the tracking generator 17. The negative pulses of Curve F are derived from the trailing edges of the pulses of Curve E and since the last-mentioned pulses progressively increase in duration, the negative pulses effectively sweep over a range of times relative to the time-reference or second pulses of the paired pulses of Curve A. This range of times is related to the spacing between the second pulses of adjacent pairs of pulses of Curve A. The tracking gate generator 17 develops the constant amplitude and constant duration output pulses represented in Curve G from the negative-going pulses of Curve F. Like the last-mentioned pulses, the tracking pulses of Curve G sweep over the range of times relative to the time-reference pulses occurring at times $t_2$, $t_4$, $t_6$, etc. It will be noted in Fig. 2 that the tracking pulses of Curve G occur at the ends of intervals $t_2$-$t_3$, $t_4$-$t_5$, $t_6$-$t_7$, etc. which represent progressively greater intervals. Accordingly, during the interval $t_1$-$t_{11}$ the tracking pulses effectively sweep over a range such as 100 miles in search for received reply pulses from a selected responder beacon for the purpose of conditioning the coincidence detector 47 to translate any reply pulses which are coincident with the recurrently generated tracking pulses. To simplify the representation and to promote a clearer understanding, Fig. 2 of the drawings illustrates only five tracking pulses during the sweep interval of the amplifier or oscillator 34. However, it will be understood that many such pulses occur during that sweep interval. In one embodiment of the invention, the interrogating rate of the transmitter 11 may be 15 per second so that 300 tracking pulses are developed during the sweep of the oscillator 34.

In the absence of any output pulses from the receiver 15, a signal is not applied to the coincidence detectors 47 and 64. Accordingly, output signals are not derived by those units. In the event a negative polarity output signal is not applied by the coincidence detector 64 through the diode 70 to the control electrode of the tube 66, the tube 66 is fully conductive and develops a potential at its cathode of sufficient value to render the glow tube 76 conductive and to supply from the point Z a substantially constant potential of about 6 volts for application through the track-out diode 54 to the control electrode of the tube 36, as previously stated. The distance-measuring equipment is then in its searching condition wherein it is capable of responding to reply pulses from a responder beacon. This search operation may continue as described above in connection with Fig. 2.

*Explanation of operation of distance-measuring equipment as modified by control system 90*

It will now be assumed that a false reply signal constituting a pair of random pulses having the proper spacing from each other and from the interrogating pulses has been received by the receiver 15 from a nearby object such as an aircraft carrying beacon or interrogating equipment. When the first pulse of a pair of pulses is applied to the coincidence detector 47 simultaneously with the application of a tracking pulse from unit 17, that coincidence detector is rendered conductive and translates to its output circuit a relatively short duration pulse for application to the wide pulse generator 48. The generator 48 responds to the leading edge of the output pulse from the detector 47 and develops a wide pulse having a duration greater than that of the tracking pulse and the output pulse from unit 47 for application to the differentiating circuit and amplifier 63. Assuming that control 83 has been adjusted to provide output pulses of a duration corresponding to the spacing between a selected pair of coded reply pulses, which spacing corresponds with that of the received random pulses, an output pulse of generator 48 is differentiated and amplified and only a pulse corresponding to the trailing edge of the applied pulse is translated to an input circut of the coincidence detector 64. The second pulse of a received pair of pulses from unit 15, when applied to the coincidence detector 64 simultaneously with the application of a pulse from unit 63, is effective to render the detector conductive and develop in its output circuit at time $t_f$, as represented by Curve O of Fig. 3, a negative polarity pulse for application through the condenser 69 to the cathode of the diode 70.

This pulse renders the diode momentarily conductive and at time $t_f$ a negative polarity pulse (see Curve P of Fig. 3) of somewhat greater duration than the output pulse of the detector 64 is applied to the control electrode of the cathode follower 65 as a result of the pulse-stretching action of the condenser 72 and the resistors 67 and 68. This negative pulse momentarily changes the potential at the control electrode of the tube 66 from a positive value, such as 100 volts, to a negative value, such as −5 volts, thus momentarily rendering the tube non-conductive. The resistors 67 and 68 then slowly dissipate the negative charge applied to the condenser 72 and this charge decays exponentially during the interval $t_f-t_1$ as represented by Curve P. Since the negative pulse applied to the control electrode of the tube 66 momentarily terminates the flow of anode current through the resistor 68, that pulse causes the cathode potential to decrease at time $t_f$ from a positive value of about 105 volts to 0 as represented by Curve Q of Fig. 3. Thereafter, during the interval $t_f-t_1$, the cathode potential rises exponentially with that of the control electrode toward the positive value of 105 volts since the flow of anode current is controlled by the potential of the control electrode.

When the potential of point Y representing the cathode of the tube 66 falls to zero, a high positive potential no longer exists across the glow tube 76 so that it becomes nonconductive. Just prior to time $t_f$ when the distance-measuring equipment was in its searching condition, the glow tube was conductive and the potential drop across the electrodes thereof was about 55 volts, thus placing the point X at a potential of about 50 volts. The reduction of the potential of point Y to 0 at time $t_f$, however, removes the positive potential from point X and its potential is reduced to −8 volts as represented by Curve R of Fig. 3. The negative potential just mentioned is that of the source −C and has a substantially constant value. Since point Z simultaneously falls in potential with the point X at time $t_f$, the anode potential of the clamping diode 85 falls to −8 volts at the time $t_f$, thus rendering the tube nonconductive and isolating the source of potential +B' from the point Z. The variation in potential at point Z is represented by Curve S of Fig. 3. At time $t_f$, therefore, the source −C applies a negative potential through the resistors 59, 58, and 57 to the anode of the track-out diode 54, thus rendering the diode nonconductive and effectively leaving the control electrode of the sweep oscillator 34 floating at the level of the potential appearing thereon at the moment the diode became nonconductive since the condenser 39 lacks an effective discharge path. As a result, the anode potential of the tube 36 remains constant at the value it had when the diode 54 became nonconductive. The magnitude of the sweep potential developed at the anode of the generator 19 is then determined by that voltage appearing at the anode of the tube 36.

At the time $t_f$ the searching and tracking device 18 is responsive to the potential of the anode of the tube 36, which at this time may be considered a constant potential, for causing the distance-measuring equipment to initiate tracking. A complete explanation of the tracking operation will be given subsequently and such operation will only be referred to briefly at this time in order to facilitate the understanding of the invention. The tracking operation initiated at this time is an erroneous one since it was caused by the reception of a single pair of false reply pulses. Accordingly, it is desired that the equipment be conditioned to resume its searching operation after a very short delay, otherwise a plurality of such delays occurring during a search sweep might prolong the sweep many seconds, thus wasting considerable time and perhaps depriving a fast-moving aircraft equipped with distance-measuring equipment of valuable navigational information at the time when it is most needed. The control system 90 of the present invention reduces this delay and conditions the searching and tracking device 18 quickly to resume its full searching speed after the reception of a pair of false reply pulses in a manner presently to be explained. In one embodiment of the invention, such resumption has required but a minor fraction of a second.

Figure 3:
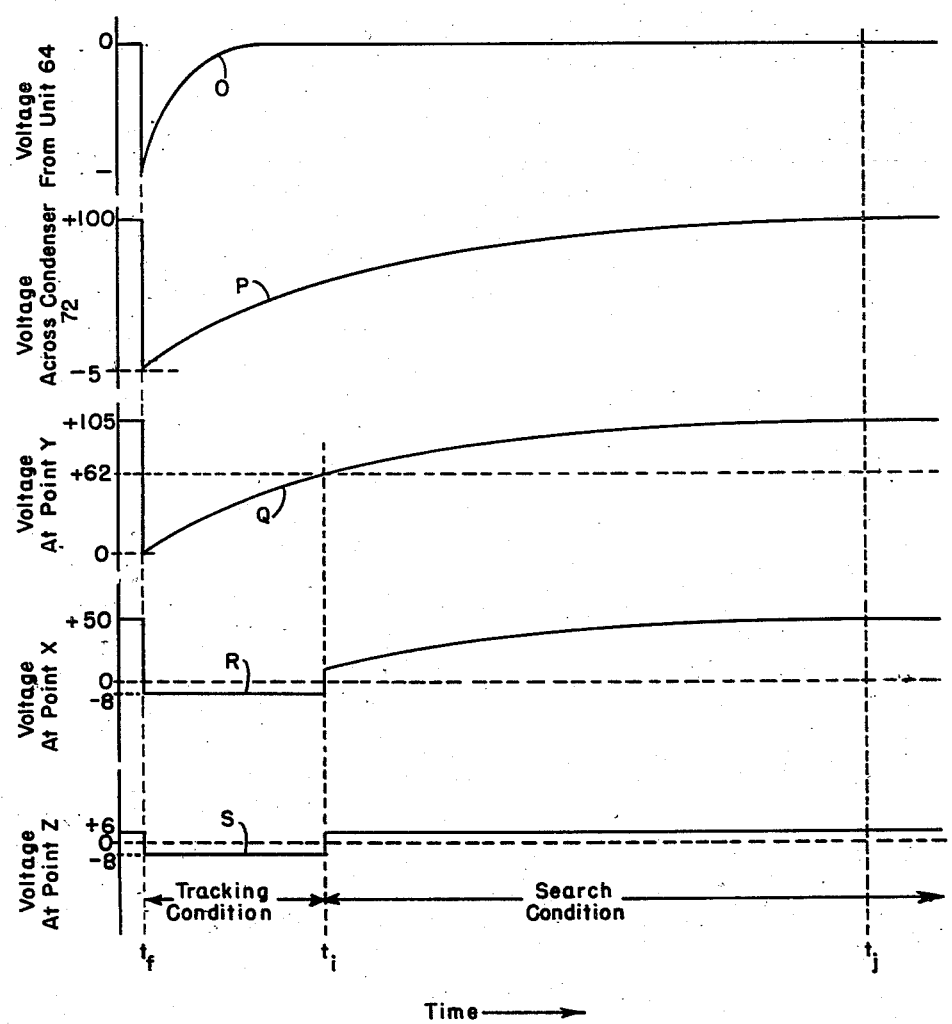
Fig. 3 is a graph utilized in explaining the operation of the control system of the distance-measuring equipment.

As the potential of point Y rises exponentially from its 0 value at time $t_f$, as represented in Curve Q of Fig. 3, to a more positive value, it soon reaches a value at time $t_i$ which, taken in conjunction with that of the source −C, represents the striking potential of the glow tube 76, which potential may be of the order of 70 volts. This renders the glow tube 76 conductive and the potential drop across that tube decreases in accordance with the well-known characteristic of glow tubes from a value of about 70 volts to 55 volts. The latter voltage now represents a constant voltage drop developed across the glow tube during its conductive intervals even though the potential applied to the electrode connected to the point Y increases as represented by Curve Q. As a result of the difference between the striking or ionizing potential of 70 volts and the operating potential of about 55 volts occurring at time $t_i$, the point X experiences a difference of potential of about 15 volts, which causes the potential of point X to rise substantially instantaneously at time $t_i$ from the potential of −8 volts comprising that of the source −C to a positive potential of 7 volts as represented by Curve R of Fig. 3. Thereafter, during the interval $t_i-t_j$ the potential of point X increases exponentially as represented.

While the potential of point X increases suddenly to a positive value of 7 volts at time $t_i$, the point Z simultaneously rises in potential as represented in Curve S and causes the diode 85 to become conductive almost instantaneously since its anode potential now momentarily exceeds that of its cathode. The diode 85 clamps the potential of point X to the substantially constant positive potential of 6 volts developed by the source +B'. This positive potential at point Z is applied through resistor 57 to the anode of the track-out diode 54, thus rendering it conductive and permitting the charging of the condenser 39 to resume where it left off prior to the reception of the pair of false reply pulses. The charging of the condenser 39 permits the anode potential of tube 36 to decrease as represented by Curve D of Fig. 2, thus enabling the searching and tracking device 18 instantaneously to resume its searching condition at time $t_i$ in Fig. 3.

From the foregoing explanation it will be seen that a control voltage such as that represented by Curve Q of Fig. 3 having a relatively slow exponential variation is changed after a very short interval, such as 0.2 second, to one with an instantaneous variation from one predetermined level to another as represented by Curve S, thereby substantially instantaneously changing the operation of the searching and tracking device of the distance-measuring equipment from one condition to another. The glow tube 76 which is employed in the voltage-divider apparatus of the control system 90 also serves another very useful function. This tube may be mounted on the instrument panel of the distance-measuring equipment and when it is conductive it will develop a glow which indicates to the pilot that the distance-measuring equipment is operating in its searching condition. Likewise, when the tube is de-ionized, a glow is not present and this will indicate to the operator that the equipment is performing a tracking function.

While the transition from the searching condition to a tracking condition and a return to the searching condition has been explained with reference to the reception of a single pair of false reply pulses, it will be apparent that similar interruptions of the searching operation followed by a return to the searching condition after a short tracking interval will take place as additional pairs of random false reply pulses are applied to the receiver of the distance-measuring equipment.

During the course of a searching operation, the receiver 15 may receive a desired pair of coded reply pulses from a responder beacon followed in rapid succession by a plurality of such paired pulses. The first pair of pulses is effective to actuate the coincidence detectors 47 and 64 of Fig. 1 so that the latter develops a negative control pulse for application to the control system 90. The control system begins its tracking operation as previously explained. The succeeding pairs of regularly recurring reply pulses are effective to cause the coincidence detector 64 to develop periodic control pulses having a separation less than the interval $t_f-t_i$ of Fig. 3, thus preventing the control system 90 from undergoing the transition in its operation represented a time $t_i$ of Fig. 3. The periodic control pulses of the type presently under consideration gradually apply a negative charge through the resistor 73 to the relatively large condenser 74. Accumulation of a sufficiently large charge across the condenser 74 is effective to ensure that the tube 66 is biased to cutoff for an interval corresponding to the interval between the first and the last of the applied control pulses plus an interval corresponding to the time required for the condensers 72 and 74 to discharge through the resistors 73, 67, and 68. The interval essentially corresponding to the time constant of the network 74, 73, 67, 68 represents the so-called "memory" period of the distance-measuring equipment and maintains the equipment in its tracking condition for a short period of time should the receiver 15 fail to receive a few of the paired reply pulses from the interrogator-responder beacon for reasons such as momentary failure of the responder beacon or the situation wherein the surface of the aircraft might shield the receiving antenna thereof during a turning operation.

*Explanation of tracking operation of distance-measuring equipment of Fig. 1*

Figure 4:
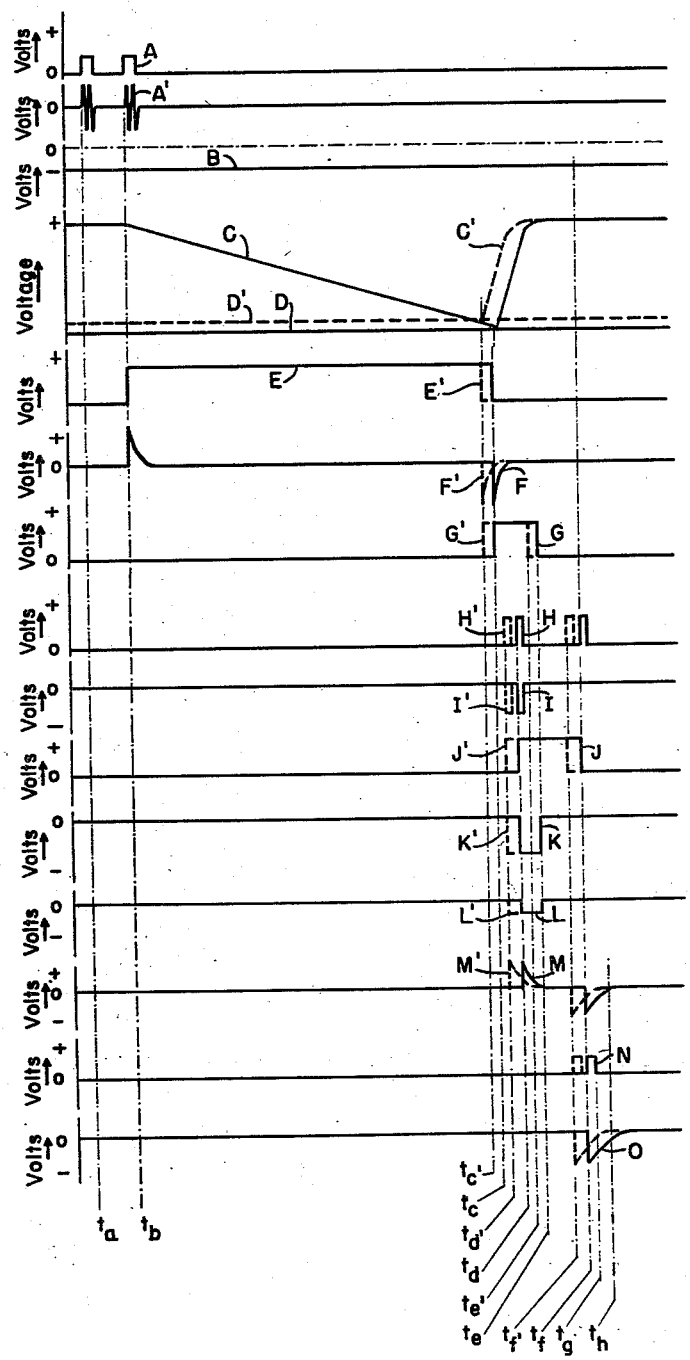
Fig. 4 is a graph employed in explaining the tracking operation of the distance-measuring equipment.

In considering the tracking operation of the distance-measuring equipment, reference is made to Fig. 4 of the drawings. Curves A and A′ represent, respectively, a pair of timing pulses from the timer 10 and a pair of transmitted interrogating pulses radiated by the antenna system associated with the transmitter 11. Curve B represents the potential appearing at the control electrode of the sweep oscillator 34 which is presently functioning as an amplifier. It will be assumed that this potential is somewhat less than the maximum value of 0 volts to which the condenser 39 may charge. Full-line Curve C represents to a scale, which is considerably expanded horizontally but reduced vertically with relation to the scale of Curve C of Fig. 2, the sweep potential developed at the anode of the tube 20. The trace portion of this sweep potential is developed during the interval $t_b-t_c$ and the retrace portion occurs during the interval $t_c-t_f$. Curve C may be considered to represent a single sweep of the generator 19, for example, a sweep which will sensitize the coincidence detector 47 to receive signals from a responder beacon at a range of about 80 miles and this sweep may correspond to that represented during the interval $t_8-t_9$ of Curve C of Fig. 2. It will be clear that successive pairs of timing pulses following those represented by Curve A of Fig. 4 are capable of developing similar sweep potentials corresponding to Curve C. During the interval $t_a-t_f$, the potential of the screen electrode of the tube 20 varies in a manner represented by full-line Curve E, becoming more positive during the interval $t_b-t_c$. The differentiating circuit 32 derives from the screen-electrode output signal of the tube 20 the signal represented by full-line Curve F of Fig. 4. The negative-going pulse occurring at time $t_c$ is effective to trigger the tracking gate generator so that the latter develops the tracking pulse represented by the full-line Curve G, which pulse has a constant amplitude and a duration occupying the interval $t_c-t_e$. It will now be assumed that the first received pulse represented by full-line Curve H is applied to the coincidence detector 47 at time $t_d$, which time corresponds exactly with the center of the tracking pulse of Curve G. The conjoint action of the first received pulse of Curve H and the tracking pulse of Curve G is effective to render the coincidence detector 47 conductive at time $t_d$, which corresponds with the leading edge of the received pulse, whereby the detector develops an output pulse represented by full-line Curve I. This output pulse is applied to the wide pulse generator 48 which develops the wide pulse of full-line Curve J that occupies the interval $t_d-t_f$. The tracking pulse of Curve G from generator 17 and the wide pulse of Curve J from the generator 48 are applied to the two input circuits of the coincidence detector 49 and that unit develops the output pulse of full-line Curve K having a duration $t_d-t_e$ which corresponds to the interval during which the wide pulse of Curve J and the tracking pulse of Curve G are coextensive in time or overlap.

The wide pulse of Curve J from the generator 48 is differentiated by the condenser 56 and the resistors 57, 58, and 59 to develop the differentiated signal represented by full-line Curve M, which signal comprises a positive-going pulse having a duration $t_d-t_e$ and a negative-going pulse having a duration $t_f-t_h$. The positive-going pulse applied to the anode of the track-out diode 54 is effective to render it conductive. The potentiometer 60 is so adjusted that when the first received pulse of Curve H lies in the center of the tracking pulse of Curve G, the negative-going pulse translated by the track-in diode 53 has an amplitude such that the energy content of the translated pulse corresponds exactly with that of the positive-going pulse translated by the track-out diode 54. Such a pulse translated by diode 53 is represented by Curve L of Fig. 4. Under this condition, the charge on the condenser 39 in the input circuit of the amplifier 34 remains unchanged. Consequently, the anode potential of the tube 36 remains at the level of Curve D of Fig. 4 and successive sweep waves (not shown) developed at the anode of the tube 20 as a result of the application of periodic synchronizing signals applied to the terminals 13, 13 of generator 19 have a lower limit determined by the anode potential of tube 36.

The wide pulse of Curve J developed by the generator 48 is also applied to the differentiating circuit and amplifier 63 which first develops the differentiated pulses which may also be represented by full-line Curve M and, by the well-known process of limiting and amplification, develops a positive output pulse occurring at time $t_f-t_g$ (see full-line Curve N) for application to an input circuit of the coincidence detector 64. The second of the received paired pulses is applied to the coincidence detector 64 at substantially time $t_f$ and with the pulse of Curve N renders the detector conductive to develop another negative potential pulse represented by Curve O for application to the control electrode of the cathode follower 65. This pulse momentarily charges the condenser 72 in a sense which will keep the glow tube 76 nonconductive for an interval of time and maintain the potential represented by Curve B on the control electrode of the tube 36.

It will now be assumed that a first received pulse of a pair of pulses from the responder beacon is not at the exact center of the tracking pulse of Curve G. Such a condition is represented by the broken-line pulse of Curve H′ of Fig. 4, which pulse occurs at time $t_d'$. Such a condition may exist as when the aircraft is moving toward the responder beacon so that the distance therebetween changes. The application of the pulse of Curve G and the broken-line pulse of Curve H′ to the input circuits of the coincidence detector 47 results in a translation at time $t_d'$ of a pulse represented by broken-line Curve I′. The application of the pulse of Curve I′ to the wide pulse generator 48 results in the generation thereby during the interval $t_d'-t_f'$ of a broken line wide pulse of Curve J′. It will be seen that this pulse has the same duration as the full-line pulse of Curve J but the pulse occurs somewhat sooner. The application of the pulses of Curves G and J′ by units 17 and 48 to the coincidence detector 49 results in the generation of a negative output pulse represented by Curve K′, which output pulse has a duration $t_d'-t_e'$. The duration of this pulse corresponds to time during which the tracking pulse of full-line Curve G is coextensive in time with the wide gate pulse represented by Curve J'. The pulse of Curve K' has a duration which exceeds that of the pulse of Curve K by the time of advance of the pulse of Curve J' with reference to that of Curve J.

The pulse which is translated by the track-in diode 53 is represented by broken-line Curve L' and the positive polarity pulse which is translated by the track-out diode 54 to the control electrode of the tube 36 is represented by broken-line Curve M'. The duration of the last-mentioned pulse is the interval $t_d'-t_e'$ and its duration is, therefore, the same as the corresponding pulse of full-line Curve M somewhat shorter than that of the pulse of Curve L' occupying the interval $t_d'-t_e'$. Accordingly, the energy content of the negative-going pulse applied by the track-in diode to the control electrode of the tube 36 is greater than that of the positive-going pulse applied thereto by the track-out diode 54. Accordingly, the condenser 39 in the control-electrode circuit of tube 36 is charged in a sense to permit the anode potential of the tube to increase to the level represented by the broken-line Curve D' of Fig. 4. During a later sweep of the generator 19 (for convenience of representation being considered to commence at time $t_b$) the diode 35 becomes conductive at a level corresponding to that represented by Curve D' so that the anode potential of the tube 20 cannot fall below that level. The retrace portion of the aforesaid later sweep will then commence at time $t_c'$ and is represented by the broken-line Curve C'. The later pulse developed at the screen electrode of the tube 20 will terminate at a time such as the time $t_c'$ as shown by broken-line Curve E', and an output pulse derived by unit 32 from the trailing edge of the pulse of Curve E' likewise occurs at time $t_c$. The negative-going differentiated pulse occurring at time $t_c'$ triggers the tracking gate generator 17 so that it develops an output pulse which may be represented by the broken-line Curve G', which pulse has a constant duration and a leading edge occurring at time $t_c'$. It will be seen from the representation of Curves G' and H' that the received pulse is now centered with reference to the new tracking pulse.

Should the received pulse be centered within the right-hand half of the full-line pulse of Curve G, the action of the tracking circuit is similar to that just described except that the negative pulse translated by the track-in diode is of smaller energy content than the positive pulse translated by the track-out diode 54. Under this condition, the charge applied to the condenser 39 is of a sense to cause the tracking gate pulse to track out, that is, to be displaced to the right of the position represented by Curve G so that the received pulse is centered on that tracking pulse. Thus, the tracking generator 17 may be said to cause the developed tracking pulse to track the first pulse of the received paired pulses from the responder beacon.

The distance to the beacon which is being interrogated is directly related to the potential developed at the anode of the amplifier 34 and may be measured by the range calibrated voltmeter coupled between the anode and the cathode of the tube 36.

In the event the pilot desires to secure information as to his distance from another responder beacon which ordinarily responds to a different code, the adjustable control 86 of the delay network 12 is adjusted to provide a different time delay between paired pulses applied to the transmitter 11 thereby changing the interrogating code, and the adjustable control 83 is positioned to develop a wide pulse having a duration corresponding to the spacing of the paired reply pulses transmitted by that beacon in response to its interrogation. The ganged switches 40 and 75 may be momentarily closed and the operation of the distance-measuring equipment begins to search in the manner previously described and, upon the reception of paired pulses having the new proper spacing, the tracking system takes over and provides a distance indication on the meter 45 in the manner previously described.

While applicants do not wish to be limited to any particular circuit values for the embodiment of the invention described above, there follows a set of representative values which may be utilized in the control system 90 of Fig. 1:

| | |
|---|---|
| Resistors 37, 68 | 100 kilohms. |
| Resistor 38 | 22 kilohms. |
| Resistor 41 | 68 kilohms. |
| Resistor 57 | 2.7 megohms. |
| Resistors 58, 61, 71 | 470 kilohms. |
| Resistor 59 | 220 kilohms. |
| Resistor 60 | 500 kilohms (max.). |
| Resistor 67 | 1 megohm. |
| Resistor 73 | 4.7 megohms. |
| Resistor 77 | 47 kilohms. |
| Condenser 39 | About 10 microfarads. |
| Condensers 42, 43 | 0.47 microfarad. |
| Condensers 69, 72 | 0.1 microfarad. |
| Condenser 74 | 2 microfarads. |
| Tubes 36, 66 | Type ½ 6U8. |
| Tube 76 | Type NE-51. |
| Diodes 54, 70, 85 | Type ½ 6AL5. |
| +B | 250 volts. |
| Sweep duration of generator 34 | About 20 seconds. |
| +B' | 6 volts. |
| +B'' | 100 volts. |
| +Sc | 100 volts. |
| —C | —8 volts. |
| Maximum sweep voltage variation of generator 34 | About 200 volts. |

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a radio position locator including a searching and tracking device responsive to a constant potential for initiating tracking and a varying potential for searching, a control system comprising: a first circuit effective to develop a first potential of an approximately constant value during a searching interval; a time-constant control circuit coupled to said first circuit for applying thereto a control signal effective to initiate a tracking interval and to vary said first potential in a predetermined manner from said value during said tracking interval; a voltage-divider apparatus responsive to said first potential during said searching interval for developing during said searching interval a second potential having a substantially constant value and responsive to said variation in said first potential during said tracking interval for developing a third potential during said tracking interval and for substantially instantaneously developing said second potential at the end of said tracking interval; and a translating circuit for deriving from said second potential and applying to the device a varying searching potential and for deriving from said third potential and applying to the device a constant potential for initiating tracking.

2. In a radio position locator including a searching and tracking device responsive to a constant potential for initiating tracking and a varying potential for searching, a control system comprising: a first circuit including an electron-discharge device which is conductive during a searching interval and which is effective to develop a first potential of an approximately constant value during said searching interval; a time-constant control circuit coupled to said electron-discharge device for applying thereto a control signal effective momentarily to render said device nonconductive and initiate a tracking interval and to vary said first potential in a predetermined manner from said value during said tracking interval; a voltage-divider apparatus responsive to said first potential during said searching interval for developing during said searching interval a second potential having a substantially constant value and responsive to said variation in said first potential during said tracking interval for developing a third potential during said tracking interval and for substantially instantaneously developing said second potential at the end of said tracking interval; and a translating circuit for deriving from said second potential and applying to the searching and tracking device a varying searching potential and for deriving from said third potential and applying to the searching and tracking device a constant potential for initiating tracking.

3. In a radio position locator including a searching and tracking device responsive to a constant potential for tracking and a varying potential for searching, a control system comprising: a cathode-follower repeater including a control electrode-cathode input circuit and an output circuit effective to develop in said output circuit a first potential of an approximately constant value during a searching interval; a time-constant control circuit coupled to said input circuit for applying thereto a control signal effective to initiate a tracking interval and to vary said first potential in a predetermined manner from said value during said tracking interval; a voltage-divider apparatus coupled to said output circuit and responsive to said first potential during said searching interval for developing during said searching interval a second potential having a substantially constant value and responsive to said variation in said first potential during said tracking interval for developing a third potential during said tracking interval and for substantially instantaneously developing said second potential at the end of said tracking interval; and a translating circuit for deriving from said second potential and applying to the device a varying searching potential and for deriving from said third potential and applying to the device a constant potential for initiating tracking.

4. In a radio position locator including a searching and tracking device responsive to a constant potential for initiating tracking and a varying potential for searching, a control system comprising: a first circuit effective to develop a first potential of an approximately constant value during a searching interval; a time-constant control circuit coupled to said first circuit for applying thereto a control signal effective to initiate a tracking interval and to vary said first potential in a predetermined manner from said value during said tracking interval; a voltage-divider apparatus including a device having a nonlinear characteristic responsive to said first potential during said searching interval for developing in a portion of said apparatus during said searching interval a second potential having a substantially constant value and responsive to said variation in said first potential during said tracking interval for developing in said portion a third potential during said tracking interval and for substantially instantaneously developing in said portion said second potential at the end of said tracking interval; and a translating circuit for deriving from said second potential and applying to the searching and tracking device a varying searching potential and for deriving from said third potential and applying to the searching and tracking device a constant potential for initiating tracking.

5. In a radio position locator including a searching and tracking device responsive to a constant potential for initiating tracking and a varying potential for searching, a control system comprising: a first circuit effective to develop a first potential of an approximately constant value during a searching interval; a time-constant control circuit coupled to said first circuit for applying thereto a control signal effective to initiate a tracking interval and to vary said first potential in a predetermined manner from said value during said tracking interval; a voltage-divider apparatus including a gaseous-discharge device which is conductive in response to said first potential during said searching interval for developing in a portion of said apparatus during said searching interval a second potential having a substantially constant value and which is rendered nonconductive in response to said variation in said first potential during said tracking interval for developing in said portion a third potential during said tracking interval and for substantially instantaneously developing in said portion said second potential at the end of said tracking interval; and a translating circuit for deriving from said second potential and applying to the device a varying searching potential and for deriving from said third potential and applying to the device a constant potential for initiating tracking.

6. In a radio position locator including a searching and tracking device responsive to a constant potential for initiating tracking and a varying potential for searching, a control system comprising: a first circuit effective to develop a first potential of an approximately constant value during a searching interval; a time-constant control circuit coupled to said first circuit for applying thereto a control signal effective to initiate a tracking interval and to vary said first potential in a predetermined manner from said value during said tracking interval; a voltage-divider apparatus including a glow tube which is conductive in response to said first potential during said searching interval for developing in a portion of said apparatus during said searching interval a second potential having a substantially constant value and which is rendered nonconductive in response to said variation in said first potential during said tracking interval for developing in said portion a third potential during said tracking interval and for substantially instantaneously developing in said portion said second potential at the end of said tracking interval; and a translating circuit for deriving from said second potential and applying to the device a varying searching potential and for deriving from said third potential and applying to the device a constant potential for initiating tracking.

7. In a radio position locator including a searching and tracking device responsive to a predetermined potential for initiating tracking and a varying potential for searching, a control system comprising: a first circuit effective to develop a first potential of an approximately constant value during a searching interval; a time-constant control circuit coupled to said first circuit and responsive to individual pulses for applying thereto a control signal comprising control pulses individually effective to initiate a tracking interval and to vary said first potential in an exponential manner from said value during said tracking interval, said control circuit having a time constant greater than the duration of said first-mentioned pulses; a voltage-divider apparatus responsive to said first potential during said searching interval for developing during said searching interval a second potential having a substantially constant value and responsive to said variation in said first potential during said tracking interval for developing a third potential during said tracking interval and for substantially instantaneously developing said second potential at the end of said tracking interval; and a translating circuit for deriving from said second potential and applying to the device a varying searching potential and for deriving from said third potential and applying to the device a constant potential for initiating tracking.

8. In a radio position locator including a searching and tracking device responsive to a predetermined potential for initiating tracking and a varying potential for searching, a control system comprising: a first circuit effective to develop a first potential of an approximately constant value during a searching interval; a first time-constant control circuit coupled to said first circuit and responsive to individual pulses for applying thereto a control signal comprising control pulses individually effective to initiate a tracking interval and to vary said first potential in an exponential manner from said value during said tracking interval, said control circuit having a time constant greater than the duration of said first-mentioned pulses; a voltage-divider apparatus responsive to said first potential during said searching interval for developing during said searching interval a second potential having a substantially constant value and responsive to said variation in said first potential during said tracking interval for developing a third potential during said tracking interval and for substantially instantaneously developing said second potential at the end of said tracking interval; a translating circuit for deriving from said second potential and applying to the device a varying searching potential and for deriving from said third potential and applying to the device a constant potential for initiating tracking; and a second time-constant control circuit coupled to said first circuit and having a time constant much greater than that of said first control circuit and responsive only to regularly recurring ones of said first-mentioned pulses for developing a potential to maintain the device in a tracking condition.

9. In a radio position locator including a searching and tracking device responsive to a constant potential for initiating tracking and a varying potential for searching, a control system comprising: a first circuit effective to develop a first potential of an approximately constant value during a searching interval; a time-constant control circuit coupled to said first circuit for applying thereto a control signal effective to initiate a tracking interval and to vary said first potential in a predetermined manner from said value during said tracking interval; a voltage-divider apparatus including in cascade a device having a nonlinear characteristic, a first resistive impedance, a clamping device, and a source of a second potential having a substantially constant value and including a series-connected resistive impedance and a source of a third potential connected in parallel with the series combination of said first resistive impedance, said clamping device, and said second potential source, said device having said nonlinear characteristic being responsive to said first potential during said searching interval for rendering said clamping device conductive to apply said second potential to the junction of said clamping device and said first resistive impedance and being responsive to said variation in said first potential during said tracking interval for rendering said clamping device nonconductive to apply said third potential to said junction during said tracking interval and also being responsive to said variation in said first potential for substantially instantaneously developing said second potential at said junction at the end of said tracking interval; and a translating circuit for deriving from said second potential and applying to the searching and tracking device a varying searching potential and for deriving from said third potential and applying to the searching and tracking device a predetermined constant potential for initiating tracking.

10. In a radio position locator including a searching and tracking device responsive to a predetermined constant potential for initiating tracking and a varying potential for searching, a control system comprising: a cathode-follower repeater including a control electrode-cathode input circuit and an output circuit effective to develop in said output circuit a first potential of an approximately constant value during a searching interval; a time-constant control circuit coupled to said input circuit for applying thereto a control signal effective to initiate a tracking interval and to vary said first potential in a predetermined manner from said value during said tracking interval; a voltage-divider apparatus coupled to said output circuit and including in cascade a device having a nonlinear characteristic, a first resistive impedance, a clamping device, and a source of a second potential having a substantially constant value and including a series-connected resistive impedance and a source of a third potential connected in parallel with the series combination of said first resistive impedance, said clamping device, and said second potential source, said device having said nonlinear characteristic being responsive to said first potential during said searching interval for rendering said clamping device conductive to apply said second potential to the junction of said clamping device and said first resistive impedance and being responsive to said variation in said first potential during said tracking interval for rendering said clamping device nonconductive to apply said third potential to said junction during said tracking interval and also being responsive to said variation in said first potential for substantially instantaneously developing said second potential at the end of said tracking interval; and a translating circuit for deriving from said second potential and applying to the searching and tracking device a varying searching potential and for deriving from said third potential and applying to the searching and tracking device a predetermined constant potential for initiating tracking.

11. In a radio position locator including a searching and tracking device responsive to a predetermined constant potential for initiating tracking and a varying potential for searching, a control system comprising: an electron-tube repeater including an input circuit and an output circuit and effective to develop a first potential of an approximately constant value during a searching interval; a time-constant control circuit coupled to said input circuit for applying thereto a control signal effective to initiate a tracking interval and to vary said first potential in a predetermined manner from said value during said tracking interval; a voltage-divider apparatus coupled to said output circuit and including in cascade a glow tube, a first resistive impedance, a clamping device, and a source of a second potential having a substantially constant value and including a series-connected resistive impedance and a source of a third potential connected in parallel with the series combination of said first resistive impedance, said clamping device, and said second potential source, said glow tube being responsive to said first potential during said searching interval for rendering said clamping device conductive to apply said second potential to the junction of said clamping device and said first resistive impedance and being responsive to said variation in said first potential during said tracking interval for rendering said clamping device nonconductive to apply said third potential to said junction during said tracking interval and also being responsive to said variation in said first potential for substantially instantaneously developing said second potential at the end of said tracking interval; and a translating circuit for deriving from said second potential and applying to the searching and tracking device a varying searching potential and for deriving from said third potential and applying to the searching and tracking device a predetermined constant potential for initiating tracking.

12. In a radio position locator including a searching and tracking device responsive to a constant potential for initiating tracking and a varying potential for searching, a control system comprising: a first circuit effective to develop a first potential of an approximately constant value during a searching interval; a time-constant control circuit coupled to said first circuit for applying thereto a control signal effective to initiate a tracking interval and to vary said first potential in a predetermined manner from said value during said tracking interval; a voltage-divider apparatus responsive to said first potential during said searching interval for developing during said searching interval a second potential having a substantially constant value and responsive to said variation in said first potential during said tracking interval for developing a third potential during said tracking interval and for substantially instantaneously developing said second potential at the end of said tracking interval; and a sweep generator for deriving from said second potential and applying to the device a varying searching potential and for deriving from said third potential and applying to the device a constant potential for initiating tracking.

13. In a radio position locator including a searching and tracking device responsive to a constant potential for initiating tracking and a varying potential for searching, a control system comprising: a first circuit effective to develop a first potential of an approximately constant value during a searching interval; a time-constant control circuit coupled to said first circuit for applying thereto a control signal effective to initiate a tracking interval and to vary said first potential in a predetermined manner from said value during said tracking interval; a voltage-divider apparatus responsive to said first potential during said searching interval for developing during said searching interval a second potential having a substantially constant value and responsive to said variation in said first potential during said tracking interval for developing a third potential during said tracking interval and for substantially instantaneously developing said second potential at the end of said tracking interval; and a translating circuit including a switching device for deriving from said second potential and applying to the searching and tracking device a varying searching potential and for deriving from said third potential and applying to the searching and tracking device a constant potential for initiating tracking.

14. In a radio position locator including a searching and tracking device responsive to a constant potential for initiating tracking and a varying potential for searching, a control system comprising: a first circuit effective to develop a first potential of an approximately constant value during a searching interval; a time-constant control circuit coupled to said first circuit for applying thereto a control signal effective to initiate a tracking interval and to vary said first potential in a predetermined manner from said value during said tracking interval; a voltage-divider apparatus responsive to said first potential during said searching interval for developing during said searching interval a second potential having a substantially constant value and responsive to said variation in said first potential during said tracking interval for developing a third potential during said tracking interval and for substantially instantaneously developing said second potential at the end of said tracking interval; and an amplifier having an output circuit and having an input circuit coupled to said apparatus for deriving in said output circuit from said second potential and applying to the device a varying searching potential and for deriving in said output circuit from said third potential and applying to the device a constant potential for initiating tracking.

15. In a radio position locator including a searching and tracking device responsive to a predetermined constant potential for initiating tracking and a varying potential for searching, a control system comprising: a first circuit effective to develop a first potential of an approximately constant value during a searching interval; a time-constant control circuit coupled to said first circuit for applying thereto a control signal effective to initiate a tracking interval and to vary said first potential in a predetermined manner from said value during said tracking interval; a voltage-divider apparatus responsive to said first potential during said searching interval for developing during said searching interval a second potential having a substantially constant value and responsive to said variation in said first potential during said tracking interval for developing a third potential during said tracking interval and for substantially instantaneously developing said second potential at the end of said tracking interval; and a translating circuit including an output circuit and including an energy-storage input circuit coupled to said apparatus for deriving in said output circuit from said second potential and applying to the device a varying searching potential and for deriving in said output circuit from said third potential and applying to the device a predetermined constant potential for initiating tracking.

References Cited in the file of this patent

UNITED STATES PATENTS

| | | |
|---|---|---|
| 2,516,356 | Tull et al. | July 25, 1950 |
| 2,517,540 | Busignies | Aug. 8, 1950 |
| 2,543,072 | Stearns | Feb. 27, 1951 |